United States Patent [19]

McCullough et al.

[11] 4,420,110

[45] Dec. 13, 1983

[54] NON-WETTING ARTICLES AND METHOD FOR SOLDERING OPERATIONS

[75] Inventors: Allan W. McCullough, Irving; Richard A. Springer, Euless, both of Tex.

[73] Assignee: Materials Technology Corporation, Dallas, Tex.

[21] Appl. No.: 308,282

[22] Filed: Oct. 5, 1981

[51] Int. Cl.³ .......................... B23K 3/00; B23K 3/02
[52] U.S. Cl. ...................................... 228/54; 228/215; 427/249; 427/255.2; 428/627
[58] Field of Search .................. 228/54, 215, 216; 428/627; 427/249, 255.2; 148/6.31, 6.3

[56] References Cited

U.S. PATENT DOCUMENTS

| | | | |
|---|---|---|---|
| 2,473,887 | 6/1949 | Jennings et al. | 228/215 |
| 3,337,310 | 8/1967 | Printer | 428/627 |
| 3,432,915 | 3/1969 | Doyle | 228/215 |
| 3,623,921 | 11/1971 | Behringer et al. | 228/215 X |
| 3,640,689 | 7/1972 | Glaski . | |
| 3,683,965 | 6/1972 | McClure . | |
| 3,686,732 | 10/1972 | McClure . | |
| 3,712,798 | 10/1973 | Van Thyme et al. . | |
| 3,750,266 | 8/1973 | Hikido et al. | 228/215 |
| 3,874,900 | 4/1975 | Post . | |
| 4,040,870 | 12/1977 | Holzl | 427/249 X |
| 4,101,703 | 7/1973 | Schintlmeister | 428/216 |
| 4,196,233 | 4/1980 | Bitzer et al. | 427/255.2 |
| 4,237,184 | 11/1980 | Gonseth | 427/249 X |

FOREIGN PATENT DOCUMENTS 52-7831  1/1977  Japan ................. 427/255.2

Primary Examiner—Kenneth J. Ramsey
Attorney, Agent, or Firm—Hubbard, Thurman, Turner & Tucker

[57] ABSTRACT

A method providing for the non-wetting of predetermined portions of articles exposed to molten filler metals during soldering or brazing operations wherein predetermined areas of said elements are provided with a layer of chemical vapor deposited titanium carbide with an overlayer of titanium nitride or with a layer of titanium diboride to resist wetting of the coated areas by the filler metals. Articles coated by the non-wetting titanium compounds include circuit board support brackets and other elements used in immersion soldering machines, and heating elements for soldering operations such as soldering tips for various types of heated soldering tools and the like.

12 Claims, 4 Drawing Figures

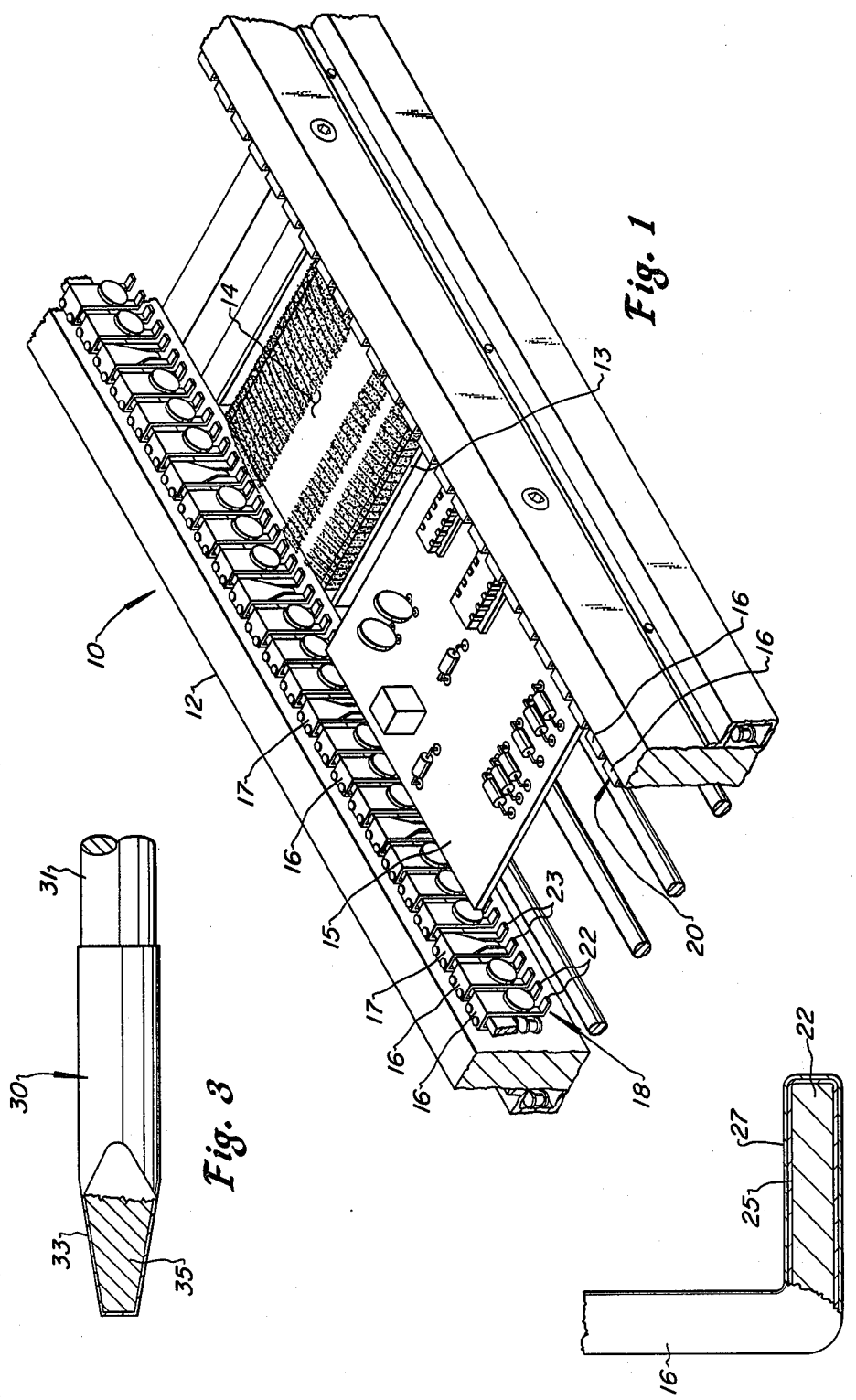

NON-WETTING ARTICLES AND METHOD FOR SOLDERING OPERATIONS

FIELD OF THE INVENTION

The present invention pertains to a method for preventing the non-wetting of articles exposed to molten filler metal associated with soldering operations, including soldering tips, which articles are coated with chemical vapor deposited titanium compounds such as titanium carbide, titanium nitride and titanium diboride.

Background Art

In various operations involving the joining of metal parts using relatively low melting point filler metals, such as solders or brazing metals, it is often desirable to prevent the coating or wetting of certain articles with the filler metal itself. For example, in the mass production of electrical circuit boards, there have been developed soldering machines of the so-called standing wave or fountain type wherein a conveyor system carries the circuit boards with the electrical components disposed therein over a standing wave or fountain of molten solder. The solder fills the voids between the components to be joined on the circuit board to complete all of the soldering operations in essentially one pass of the board through the solder wave. A problem associated with standing wave solder machines and the like, pertains to the unwanted collection of solder on various components which support the circuit board and which cannot avoid contact with the molten solder as the board is carried through the standing wave. It is conventional in the design of one type of wave soldering machine, to provide a plurality of side-by-side mounted support brackets which are mounted on opposed endless conveyor chains for conveying the circuit boards through the machine to complete the soldering process. As the support brackets for the circuit boards pass through the standing wave of molten solder, the brackets tend to collect solder which hardens on the brackets themselves resulting in an eventual buildup of solder so that the brackets are unable to properly support the boards or, in some cases, the boards accumulate solder from the brackets or become physically attached to the brackets by the solder itself.

Another problem in the art of brazing and/or soldering operations pertains to the unwanted coating or wetting of the metal probes or tips of electric soldering guns and the like, which are used for touching up or making solder connections between certain circuit components in, for example, electrical circuit boards. Normally for example, on inspection and repair of circuit boards which have been soldered, it is sometimes necessary to remelt the solder at the point of contact between the two articles to be joined by the solder without allowing the solder to flow away from the joint. This has been a problem with conventional soldering tips, in that when the heated tip is applied to the joint to cause the solder to remelt and properly fill the joint between the base metal components, the solder tends to flow over the soldering tip itself thereby causing a loss of the filler metal at the joint. Accordingly, in such situations, it is highly desirable that the solder tip itself be non-wetting, so that the molten solder retains enough surface tension with respect to the tip that it flows into the space formed by the joint of the base metal components instead of onto the solder tip.

There are also applications in soldering and brazing where it is desired that the component parts being joined together resist wetting or being coated by the filler metal except in certain areas intended for coating by the solder or braze metal. Accordingly, there are numerous applications wherein a molten filler or joining metal should resist wetting of certain articles used in connection with forming the joint between two base metal articles, or wherein two articles to be joined should be wetted or coated by the filler metal only over predetermined areas of the base metals.

To this end, the present invention provides a solution to this problem which may be applied to many types of base metals and articles formed thereof.

SUMMARY OF THE INVENTION

The present invention contemplates the provision of articles for use in connection with soldering and brazing operations wherein a relatively low melting point filler metal is used to join two or more elements of higher melting point base metals which articles upon contact with the molten filler metal resist being coated or wetted by the filler metal.

In accordance with one aspect of the present invention, it has been discovered that various ferrous and non-ferrous metal articles may be coated with a chemical vapor deposited layer of titanium carbide, titanium nitride or titanium diboride, or combinations of these compounds, said articles, upon contact with molten solders or braze metals, being resistant to being coated or wetted by such filler materials. In particular, it has been determined in accordance with the present invention that support brackets and other articles used in conjunction with standing wave or fountain type soldering apparatus, may be fabricated of ferrous alloys, including stainless, as well as alloy steels coated with composite layers of titanium carbide and an overlay of titanium nitride and, upon repeated exposure and contact with molten solder, being resistant to the wetting or coating action of the solder. In accordance with a preferred embodiment of the present invention, a composite layer of titanium carbide may be applied to conventional alloy steels with a second or overlayer of titanium nitride whereby a non-wetting surface is provided for resisting collection of solder on the articles and where the articles are also abrasion as well as corrosion resistant. The composite coating may be applied by known chemical vapor deposition techniques which result in a very non-porous surface layer on the articles which substantially resists the wetting action of molten filler metals, such as common solders and braze metals.

In accordance with another important aspect of the present invention, there is provided an article for use in connection with soldering operations, which article is normally heated to the melting temperature of the solder and used to melt or remelt solder to perform the joint making operation, and which article is coated with a layer of chemical vapor deposited titanium carbide, titanium nitride, or titanium diboride. In particular, it is contemplated that soldering tips made of ferrous as well as copper and other non-ferrous alloys, may be coated with one of the abovementioned titanium compounds to resist wetting of the soldering tip during the soldering operation. Accordingly, in operations to touch up or redistribute filler metal in a soldered joint, loss of filler metal by coating of the heated soldering tip is substantially eliminated. Still further in accordance with the present invention, it is contemplated that solder tips for use in various types of electric soldering tools and made of copper alloy, may be coated with titanium diboride vapor deposited on the surface of the tip which is to be exposed to molten solder or the like.

The present invention still further contemplates an improved method of performing soldering operations wherein there is provided a tool or article for heating the base metal articles as well as the filler metal at the joint to be formed, which tool is provided with a layer of a vapor deposited titanium compound which resists the wetting or coating action of the solder or braze metal. The present invention also contemplates the provision of various metal articles which may be selectively coated over a predetermined area with a vapor deposited coating of titanium carbide, titanium nitride, or titanium diboride to resist the wetting action of a molten filler metal and confine the filler metal to a predetermined area of joining contact with another article.

Those skilled in the art will further appreciate the superior features and advantages of the present invention upon reading the detailed description which follows.

BRIEF DESCRIPTION OF THE DRAWINGS

FIG. 1 is a perspective view of a portion of a wave soldering machine including components treated in accordance with the present invention;

FIG. 2 is a partial longitudinal elevation, partially sectioned, of a printed circuit board support bracket used in the wave soldering machine illustrated in FIG. 1 and including the improvements of the present invention;

FIG. 3 is a longitudinal side view, partially sectioned, of a tip element for a soldering tool which has been modified in accordance with the present invention.

DESCRIPTION OF THE PREFERRED EMBODIMENTS

Figure 4:
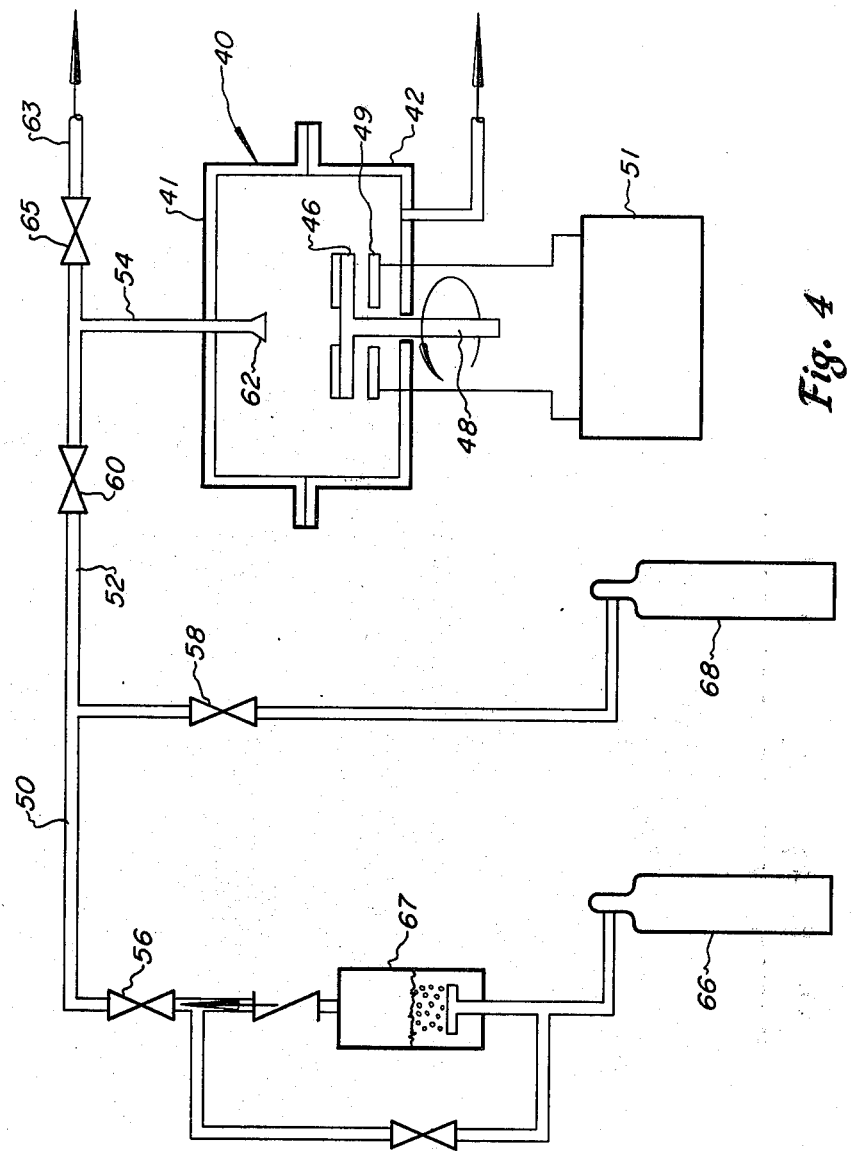
FIG. 4 is a schematic illustration of apparatus adapted for applying a chemical vapor deposited coating of titanium diboride on an article such as the element illustrated in FIG. 3.

The invention disclosed herein contemplates the formation of adherent coatings of titanium carbide (TiC), titanium nitride (TiN) and titanium diboride (TiB$_2$) on various articles formed of a metal substrate to minimize the wetting or coating action of molten filler metals on such articles in soldering and/or brazing operations. In accordance with one preferred embodiment of the present invention, an article formed of conventional ferrous alloy metals such as stainless steels and/or low carbon alloy steels, may be coated with a composite layer of titanium carbide applied directly to the metal substrate and overlayed with a layer of titanium nitride in accordance with known methods for applying such composite layers by chemical vapor deposition. In particular, reference may be made to U.S. Pat. No. 3,874,900 to Robert C. Post, et al which is assigned to the assignee of the present invention. The specific processes for applying the composite titanium carbide and titanium nitride coatings may also be carried out in connection with known procedures for the specific base metal substrates used.

It has been discovered in accordance with the present invention that several types of articles may be provided with the composite titanium carbide and titanium nitride coating or with respective singular layer coatings wherein such articles are particularly resistant to wetting or being coated with filler metals such as conventional solder alloys having a relatively high tin and lead content. Articles coated with any of the titanium compounds described herein either in single or composite layers have also been found to be resistant to wetting or coating by conventional brazing filler metals also. Although the physical properties of the respective titanium compounds which provide the resistance to wetting of the coated articles is not completely understood, it is believed that the process of providing a chemical vapor deposited layer of one or more of the titanium compounds described herein as well as related types of titanium compositions, may reduce the porosity of the base material of the article and provide a very dense and smooth surface which permits the molten filler metal to retain a substantial degree of surface tension to thereby repel the filler metal from close contact and spreading over the surface of the article.

Although articles coated with titanium carbide alone have been determined to possess the non-wetting properties when exposed to molten filler metals such as solders and brazing metals, the present invention contemplates that a suitable chemically inert or corrosion resistant coaing would be preferred by applying a composite coating of titanium carbide and an overlayer of titanium nitride generally in accordance with the teaching of U.S. Pat. No. 3,874,900. In particular, it has been determined that certain articles such as metal support brackets and the like, used in conjunction with soldering machines wherein the support brackets are repeatedly immersed in molten solder, may be provided with chemical vapor deposited coatings of titanium carbide and titanium nitride and wherein such articles resist being wetted or coated by the molten solder.

Referring to FIG. 1 of the drawings, there is illustrated a portion of a standing wave or fountain type soldering machine such as a type manufactured under the trademark "HOLLIS" by Cooper Industries, Inc., Nashua, New Hampshire. The standing wave soldering machine illustrated in FIG. 1 and generally designated by the numeral 10, includes a frame 12 on which is mounted a solder bath comprising a pot 13 and related equipment, not shown, which provides a standing wave or fountain of molten solder 14 through which the printed circuit board 15 and the like may be passed in contact with the solder sufficiently to provide the formation of electrical conductive joints between certain circuit components mounted in the board and metal conductors formed on the board itself. The machine 10 includes a series of support brackets 16 and 17 mounted side-by-side in opposed rows 18 and 20 as indicated in the drawing figure. The brackets 16 and 17 include respective laterally projecting finger portions 22 and 23 which are adapted to support therebetween a plurality of circuit boards such as the board 15. The brackets 16 and 17 are suitably mounted on respective opposed endless conveyor chains which are arranged to convey the brackets along a linear path toward and through the solder wave 14. Accordingly, the immersion of the support brackets 16 and 17 in the standing wave of solder would normally provide an accumulation of solder on the brackets which is transferred to portions of the circuit boards and may result in the boards sticking or being soldered to the brackets. Moreover, an accumulation of solder on the brackets will also, in a short period of time, render the brackets unsuitable for proper support of the circuit boards.

In accordance with the present invention, and as illustrated by way of example in FIG. 2, support brackets 16 have been fabricated of low carbon steel of the designation AISI 1040 as well as stainless steel of the designation AISI 302 and AISI 316 which have been coated with a layer of titanium carbide 25 applied through chemical vapor deposition processes such as the process described in U.S. Pat. No. 3,874,900 wherein the titanium carbide is applied directly to the steel substrate. The application of the layer of titanium carbide 25 is followed by a chemical vapor deposited layer of titanium nitride 27 which may be in accordance with the procedures for application of these coatings described in the aforementioned patent. It has been determined that articles such as the support brackets 16 when provided with a chemical vapor deposited layer of titanium carbide with an overlayer of titanium nitride substantially resists the wetting action of solder upon repeated exposure of the brackets thereto. The provision of articles such as the brackets 16 and 17 with a titanium nitride overlayer provides a substantial barrier to corrosion of the titanium carbide coating as well as the underlying substrate. The thickness of the coatings in most applications contemplated by the present invention will be dictated by the economics of the coating process since wear on the coated articles may not be a factor. However, in certain applications of coated articles for applications wherein the articles are exposed to molten filler metals, the same articles may also be exposed to abrasive action. For example, the machine 10 is provided with a rotary wire bristle type brush, not shown, for cleaning the underside of the aforementioned circuit boards. Invariably, the brackets 16 and 17 come into contact with the cleaning brushes and are susceptible to wear from the repeated brushing action. Accordingly, the composite layers of titanium carbide and titanium nitride as provided on the brackets 16 and 17 resist the wearing away of the bracket material upon repeated contact with the aforementioned brushes to further prolong the life of the brackets. It has been determined also that the coating of the brackets 16 and 17 with the composite coating of titanium carbide and titanium nitride also reduces the tendency for any galling action of the steel wire bristles on the surface of the brackets and the resultant accumulation of steel particles from the bristles on the finger portions of the brackets.

Further in accordance with the present invention, it is contemplated that certain heating elements for soldering and/or brazing operations may be provided in accordance with the discovery that certain titanium compounds when applied as chemical vapor deposited coatings on the surface of said elements provide for the elements to be substantially non-wetting in the presence of molten filler metals such as conventional solder and braze materials.

Referring to FIG. 3 of the drawings, there is illustrated a solder tip, generally designated by the numeral 30, which is of conventional configuration and includes a shank portion 31 adapted to be mounted in the bore of a heating element of an electric soldering gun for use in performing various soldering operations. In some applications of manual or automated soldering, it is desirable to apply the working end 35 of the tip to the elements to be joined at the joint itself to heat the elements as well as a quantity of solder which is already deposited on the joint or on one of the elements in the vicinity of the joint. In certain repair and/or so-called touchup soldering operations additional quantities of solder may not be provided to make up for solder which has not completely or correctly filled the void or space formed between the components to be joined. In such instances, the application of a heating element or tip that does not resist wetting or coating by the molten solder will draw away from the joint at least a portion of the solder material already deposited thereon to thereby render the joint weaker or incomplete. However, in accordance with the present invention, the provision of soldering tips or heating elements for contact with molten solder which have been coated with a layer of titanium carbide, titanium nitride or titanium diboride will resist the wetting action of the molten solder so that the solder material will be confined to the vicinity of the joint to fill the space between the components to be joined. If the tip 30 is to be formed of a ferrous alloy or a metal substrate having a suitably high melting point, preferably approximately 1000° C. or more, the element may be coated with titanium carbide and/or titanium nitride in substantially the same manner as provide for the brackets 16 and 17 described hereinabove. A combination of titanium carbide with an overlayer of titanium diboride may also be provided if the superior hardness and abrasion resistance of titanium diboride is required on substrates which have a thermal expansion coefficient which will not permit adherence of the titanium diboride layer directly to the substrate. Moreover, the thermal conductivity of copper alloys makes them particularly attractive for use as soldering tips and the like. In this regard, it is preferred to apply a coating of titanium diboride by a chemical vapor deposition process along the lines described herein which process may be carried out at a temperature sufficiently below the melting point of most copper alloys.

For example, wrought copper alloys typically used for soldering tips and other applications involving welding or brazing, may be coated with a layer of titanium diboride in a chemical vapor deposition process carried out at a reacting temperature of approximately 700° C. which will provide a coating in the range of 0.0001 inches thick when using an apparatus of the type described herein and illustrated schematically in FIG. 4.

Referring to FIG. 4, the apparatus illustrated schematically includes a sealable deposition chamber 40 comprising an upper portion 41 and a lower portion 42. The upper and lower portions are adapted to be removably secured together by conventional means, not shown. The chamber 40 includes an exhaust line 44 which is in turn connected to a conventional vacuum pump or the like for removing gases from the deposition chamber. The chamber 40 is preferably provided with a rotatable table 46 mounted on a shaft 48 which is adapted for rotation by conventional means, not shown. The table 46 is preferably constructed of a relatively inert material such as graphite or the like and the deposition chamber is preferably constructed of steel. A radiant heater 49 is disposed below the table 46 and is suitably connected to a source of electrical current including control means 51 for heating the chamber 40 and the contents thereof. Reactants are injected into the chamber 40 through conduits 50, 52 and 54 by way of control valves 56, 58 and 60, respectively, and by way of a nozzle 62.

The elements to be coated, such as the soldering tips 30 illustrated in FIG. 3, are positioned on the rotatable table 46. Alternatively, the elements to be coated may be supported on suitable hangers or the like within the chamber 40. In the process of coating copper and copper alloy elements such as the soldering tip 30, the elements are suitably cleaned to remove unwanted impurities on the surface thereof and placed within the chamber 40. The chamber is then closed and sealed, evacuated by way of line 63 and control valve 65 and refilled with dry hydrogen, for example, while the chamber is heated to approximately 700° C. and held for 20 minutes in the presence of a hydrogen environment to provide even heat distribution throughout the chamber and the contents thereof. When a steady state temperature condition is reached, dry hydrogen gas from a pressure vessel 66 is bubbled through a container 67, containing liquid titanium tetrachloride, at a pressure of 2.97 PSIG and at a flow rate of 50 standard liters per minute. The resultant mixture is conducted in gaseous form to the chamber 40 by way of conduits 50, 52 and 54. Simultaneously, with the provision of the titanium tetrachloride and hydrogen mixture, gaseous boron trichloride is conducted to the chamber from a tank 68 by way of conduits 52 and 54 at the rate of 0.94 standard liters per minute. The flow rates of the respective gases are maintained for a period of two hours while maintaining the chamber temperature at 700° C. Upon completion of the reaction, the valves 56 and 58 are closed and the chamber 40 is purged during a cool-down period with dry nitrogen from a source, not shown, for approximately 10 to 15 minutes.

Under the conditions described above, a dense, adherent, continuous coating of titanium diboride 33 is formed on the element 30, as shown in FIG. 3, and of a thickness in the range of 0.0001 inches or greater. Not only does this coating provide the tip 30 with a suitable resistance to wetting or being coated by various solder materials, but the hardness and abrasion resistance of the titanium diboride layer also enhances the life of solder tips and other heating elements used in conjunction with soldering and brazing operations.

The present invention also contemplates that certain articles may be coated with a layer of titanium carbide, titanium nitride and/or titanium diboride over predetermined surface portions thereof to confine the wetting action of a solder or braze material to a preselected area so that upon soldering or brazing of two components to each other, the filler metal is confined to a particular joint area. Those skilled in the art will recognize that various applications of the methods and articles of the present invention may be carried out in connection with soldering and brazing type operations without departing from the scope and spirit of the present invention as defined by the appended claims.

What is claimed is:

1. A method for preventing the coating of a metal article with a filler metal such as solder or braze metal, which article when exposed to said filler metal in a molten condition of said filler metal is normally wetted with a coating of said filler metal, said method comprising the steps of applying a layer of a titanium compound selected from a group which includes titanium carbide, titanium nitride and titanium diboride to the surface of said article prior to exposing said article to said filler metal.

2. The method set forth in claim 1 wherein:
said method includes the step of applying said layer by chemical vapor deposition of said titanium compound on the surface of said article.

3. The method set forth in claim 1 together with the step of:
providing said metal article of low carbon steel.

4. The method set forth in claim 1 together with the step of:
providing said article of stainless steel.

5. The method set forth in claim 3 or 4 wherein:
said method includes the steps of applying a layer of titanium carbide directly on said article followed by applying a layer of titanium nitride to said article.

6. The method set forth in claim 1 together with the step of:
providing said article of a copper alloy.

7. The method set forth in claim 6 wherein:
the step of applying said titanium compound comprises applying only a layer of titanium diboride at a temperature less than 1000° C.

8. The method set forth in claim 7 wherein:
the step of applying titanium diboride to said article includes mixing gaseous hydrogen, titanium tetrachloride, and boron trichloride in the presence of said articles disposed in a closed chamber and at a temperature of approximately 700° C.

9. An element which is heated to the melting point of a filler metal such as solder and is exposed to direct contact with said filler metal, said element being provided with a coating of a vapor deposited layer of a titanium compound including at least one layer of titanium carbide, titanium nitride or titanium diboride to resist being coated by said filler metal upon contact therewith.

10. The element set forth in claim 9 comprising:
a soldering tip having a shank portion for mounting said soldering tip in the bore of a heating element of a soldering tool, and a working tip end portion for contacting the filler metal, at least said working tip end portion being covered by a layer of said titanium compound.

11. The element set forth in claim 10 wherein:
said element comprises a wrought copper alloy having a working end coated with a layer of chemical vapor deposited titanium diboride.

12. The element set forth in claim 11 wherein:
said coating is provided by mixing gaseous hydrogen, titanium tetrachloride, and boron trichloride in the presence of said element at a temperature of approximately 700° C.

* * * * *